Feb. 25, 1969    O. L. LOOKER    3,429,111
HARVESTING APPARATUS
Filed Nov. 30, 1965    Sheet 1 of 2
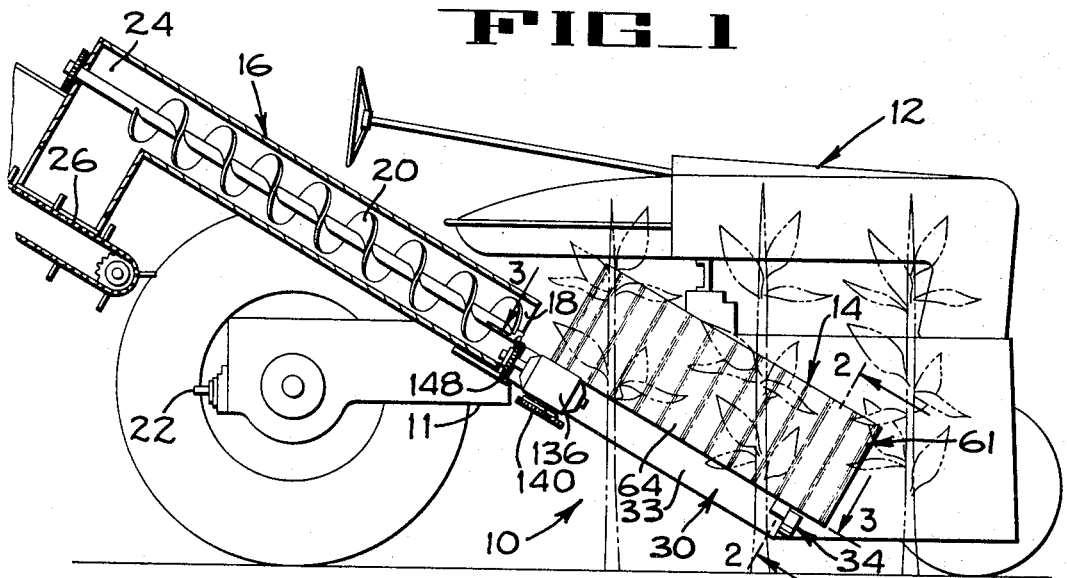
FIG_1
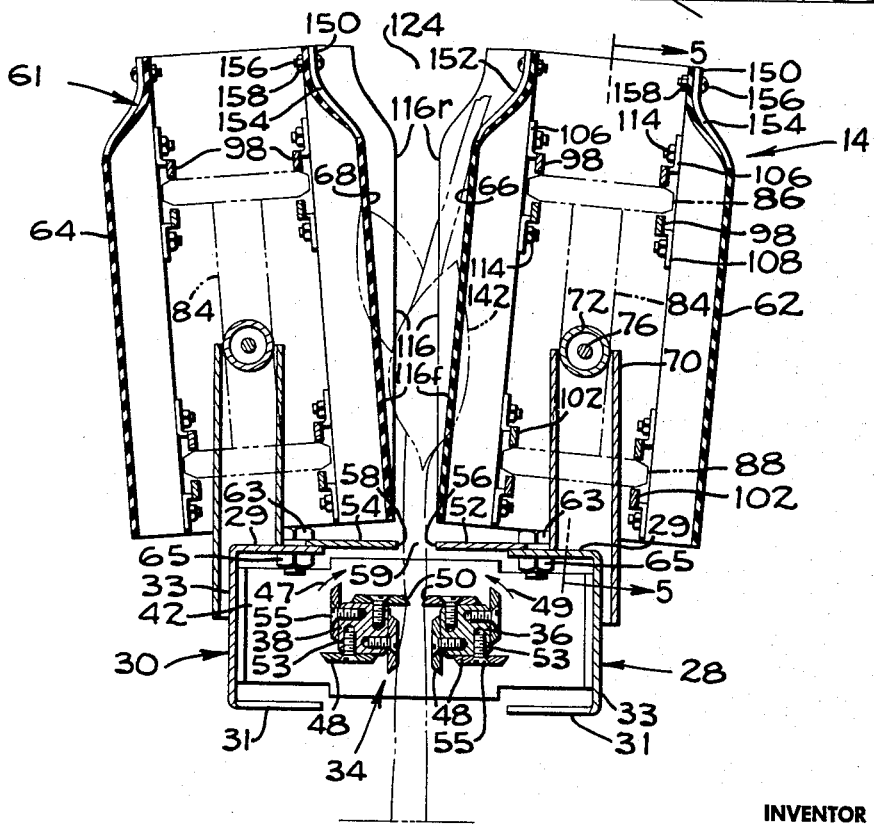
FIG_2
INVENTOR
OLIN L. LOOKER
BY Hans F. Hoffmeister
ATTORNEY

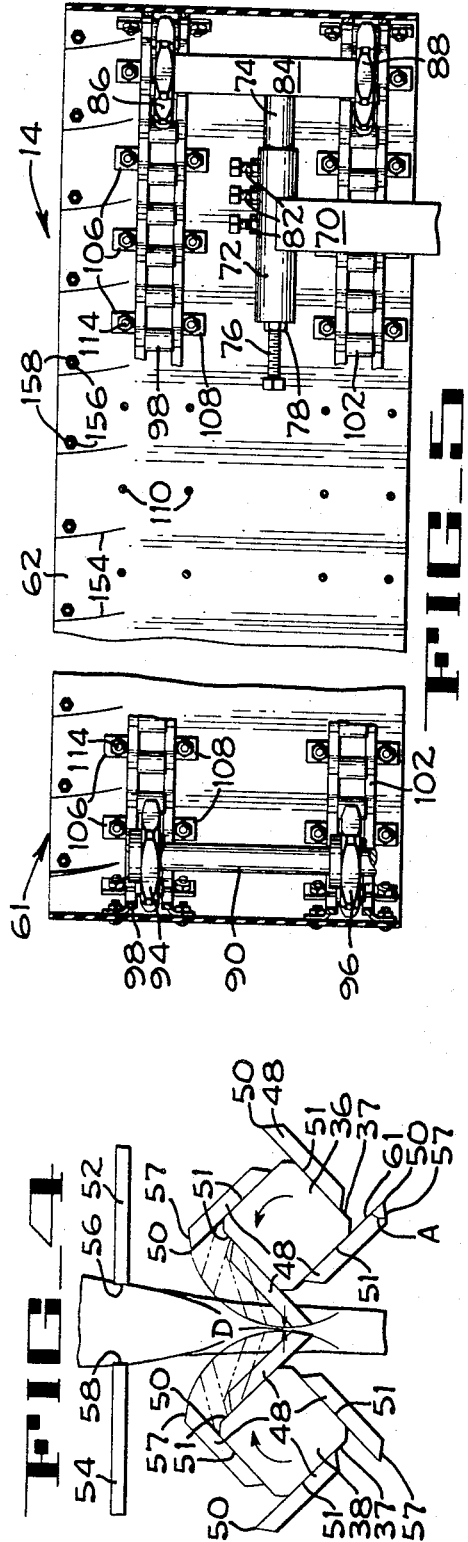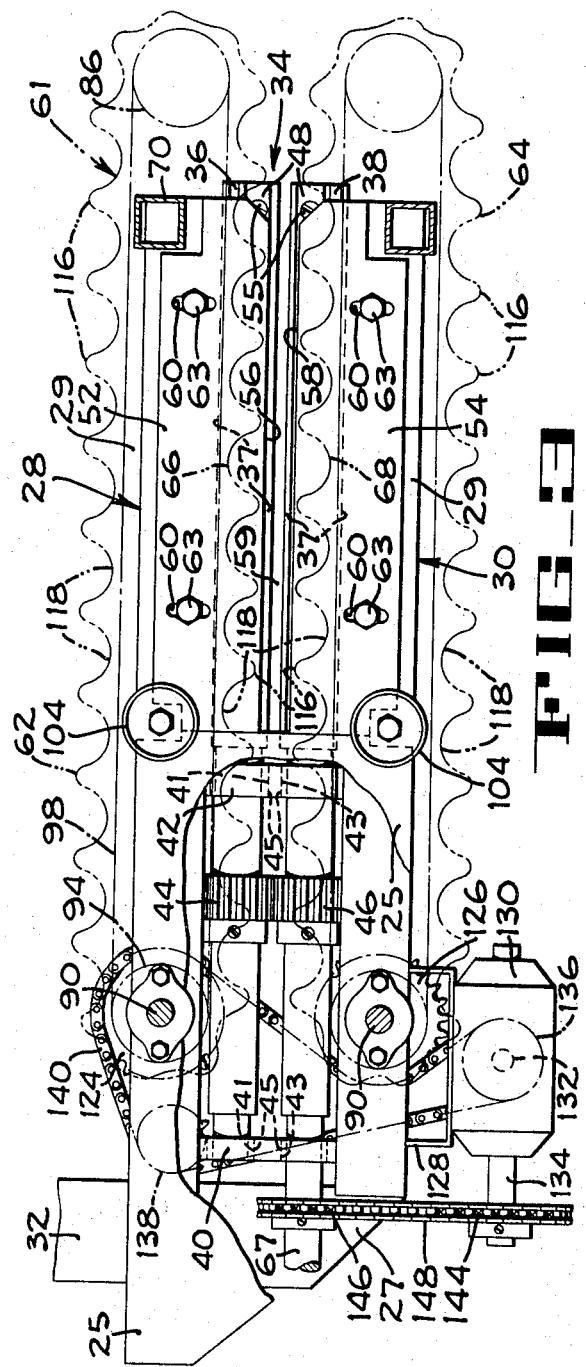
INVENTOR
OLIN L. LOOKER
BY Hans G. Hoffmeister
ATTORNEY

United States Patent Office 3,429,111
Patented Feb. 25, 1969

3,429,111
HARVESTING APPARATUS
Olin L. Looker, Milford, Ill., assignor to FMC Corporation, San Jose, Calif., a corporation of Delaware
Filed Nov. 30, 1965, Ser. No. 510,628
U.S. Cl. 56—108              3 Claims
Int. Cl. A01d 45/02

ABSTRACT OF THE DISCLOSURE

The pull knives of a corn harvester have beveled edge surfaces which are generally tangential to their orbits of rotation and are synchronized to have the same angular position. The beveled knife edges grip the cornstalks. Undulated plant gathering belts run above spaced ear abutment plates, the latter being equidistant from the ground at opposed points, at all points along their length.

---

This invention concerns a harvesting apparatus and more particularly an apparatus for removing produce from the stalk of a plant and for handling such produce before and after such removal.

Mechanical corn harvesters include what is generally termed a corn picker head mounted on a frame for movement along the rows of corn stalks. In the past, various corn picker heads have been developed which operate with varying degrees of success to remove ears of corn from their stalks by gripping upstanding stalks between counter-rotating rollers for pulling the stalks downward. The rollers are generally spaced close enough to each other that the ears cannot pass between the rollers but are forceably pinched or jerked from the stalk. Such corn picker heads have been found to damage ears of green or sweet corn by bruising the kernels as the ears are forceably pinched between the rollers.

Other types of picker heads utilize a series of counter-rotating rollers for gripping and pulling the growing stalks downward through a relatively narrow slot which causes the ears to be jerked off the stalk as the ears engage the sides of the slot. This second type of picker head has also been found to cause bruising of the kernels of sweet corn.

Therefore it is a principal object of the present invention to provide an improved apparatus for harvesting stalk type crops.

Another object is to provide an improved apparatus for severing produce from the plants on which they grow.

A further object is to provide an improved apparatus which harvests green corn without bruising or otherwise damaging the kernels.

Another object is to provide an improved stalk gripping apparatus for use in a corn harvester.

These and other objects and advantages of the present invention will become more apparent upon reading the specification set forth below in conjunction with the accompanying drawings in which:

FIGURE 1 is a side elevation of a corn harvester embodying the principles of the present invention.

FIGURE 2 is a view along the lines 2—2 of FIGURE 1.

FIGURE 3 is a horizontal section looking in the direction of arrows 3—3 of FIGURE 1.

FIGURE 4 is a simplified enlarged view of the knives of the present invention showing their action on a corn stalk and ear of corn.

FIGURE 5 is a view in the direction of lines 5—5 of FIGURE 2.

In FIGURE 1, there is shown a corn harvester 10 mounted on one side of frame 11 of a typical farm tractor 12. The corn harvester 10 is shown as including a forwardly mounted picker mechanism 14 and a rearwardly mounted conveyor assembly 16. The conveyor assembly 16, shown partially cut away, is illustrated as a well known screw type conveyor having a forward produce receiving end 18 disposed adjacent the rear end of the picker mechanism 14 and an elevating screw 20. A suitable drive mechanism (not shown) is connected between the elevating screw 20 and a power take-off shaft 22 of the tractor to effect continuous rotation of the screw during the harvesting operation. Ears of corn from the picker mechanism are conveyed to the receiving end 18 of the conveyor assembly. From there they are elevated to the rear end 24 of the conveyor assembly where they are then dropped into a suitable collecting mechanism such as a wagon loading elevator 26 which may be attached to the conveyor assembly (as shown) or to a wagon towed behind the tractor.

The picker mechanism 14 of the present invention includes two side channels or frame members 28 and 30 (FIG. 2). Each channel member is generally rectangular in cross-section having upper and lower walls 29 and 31 connected by an outside wall 33 as clearly shown in FIGURE 2. An upper rear connecting plate 25 is secured as by welding or other suitable means to the rear portion of each upper wall 29 (FIG. 3). A lower rear connecting plate 27 is also suitably attached to the rear portion of each lower wall 31. The lower connecting plate 27 includes a laterally protruding mounting arm 32 for attachment to the frame 11 of the tractor.

Connecting plates 25 and 27 rigidly maintain the channel members 28 and 30 in parallel relation with respect to each other. The mounting arm 32 is attached to the frame 11 of the tractor so that the channel members are rearwardly inclined and extend longitudinally in the direction of movement of the tractor.

The tractor 12 is guided along rows of corn stalks in a field so that each channel member 28 and 30 is disposed alongside the stalks, one on each side thereof.

In order to remove the ears of corn from the stalks as they pass between the channel members 28 and 30, a stalk gripping and ear severing mechanism 34 (FIG. 2) is mounted within the space between the channel members. The mechanism 34 comprises a pair of rotatable shafts or rotor members 36 and 38 each extending longitudinally within the space between the channel members. Each rotor member 36 and 38 is rearwardly inclined at the same angle as the channel members and spaced in parallel relationship from the other rotor by a predetermined horizontal distance. Each rotor member is equally spaced above the surface of the ground. As illustrated in FIGURES 2 and 3, the space between the rotor members 36 and 38 is centered or midway between the channel members.

A knife mounting or hub portion 37 of each rotor 36 and 38 extends forwardly of the connecting plate 25 and is substantially square in cross section as shown in FIGURE 2. The rearward portion of each rotor extends beneath the connecting plate 25 and is generally circular in cross section.

Near the rear end of the channel members 28 and 30 there is suitably attached thereto, as by bolting or welding, a transversely extending plate or bulkhead 40 (FIG. 3). Beneath the forward portion of the connecting plate 25 there is mounted another transversely extending plate or bulkhead 42 which is also suitably attached to the channel members.

Each bulkhead 40 and 42 is formed with a right and left hand bearing mounting hole 41 and 43 extending therethrough in the longitudinal direction of the channel members 28 and 30. The right hand mounting holes 41 are in line with each other, and the left hand mounting holes 43 are in line with each other. Four rotor mounting bearings 45 are suitably affixed to the bulkheads 40 and 42 within the mounting holes 41 and 43.

The circular rear portion of the rotor 36 is inserted through the right hand aligned bearings 45 and the corresponding rear portion of the other rotor 38 is inserted through the other pair of aligned bearings 45 on the other side of the bulkheads 40 and 42. It is to be noted the rear end of rotor 38 has a portion extending rearwardly of bulkhead 40. The rotors 36 and 38 are thus mounted in a cantilevered manner for rotation about their respective longitudinal axes with no support brackets to interfere with receipt of corn stalks therebetween at their extreme forward ends.

Each rotor 36 and 38 has affixed thereto a respective spur gear 44 and 46 approximately midway of the circular rear portions. The teeth of the gears 44 and 46 are intermeshed with each other. Thus rotation of one rotor will cause counter-rotation of the other rotor. In operation the left hand rotor (as viewed in FIG. 2) is driven by suitable inter-connection with a power take-off shaft of the tractor to thereby rotate it in the clockwise direction as indicated by the arrow 47 in FIGURE 2, and thus rotor 36 is caused to rotate in the counterclockwise direction as indicated by the arrow 49 in FIGURE 2. The gears 44 and 46 are of the same size thereby causing the rotors to rotate at the same angular speed.

The knife mounting or hub portion 37 of each rotor 36 and 38 provides a set of four flat surfaces 51. A plurality of threaded holes 53 extend outwardly of each flat surface. Each flat surface has associated therewith a knife 48 which is essentially a flat longitudinal bar upon which is formed a straight sharpened knife edge 50. A series of countersunk holes are formed in the knives corresponding with associated threaded holes 53 of the rotors. The knives are positioned on the associated flat surfaces so that the sharpened edges are disposed outward of the associated rotor and its axis of rotation by a predetermined radial distance. Flat head screws 55 are inserted through the countersunk holes and threaded into the holes 53 to firmly maintain the knives in position. The knives 48 lie in planes tangential to their orbits of rotation.

As illustrated in FIGURE 4, the cylindrical orbit or path of travel of the sharpened edges 50 associated with rotor 36 is spaced from the cylindrical orbit or path of travel of the sharpened edges 50 associated with the other rotor 38 by a small minimum distance D which may be, for example, about one-eighth inch. The distance D between the orbits is located on a plane defined by the axes of rotation of the rotors 36 and 38.

At the time that the rotors 36 and 38 are assembled, the gears 44 and 46 are adjusted so that when one sharpened edge 50 of one rotor is in the plane defined by the rotor axes, a sharpened edge associated with the other rotor is also in the aforementioned plane. In this manner the knife edges 50 are rotated in synchronism with each other according to a predetermined relationship whereby the movement of the knives of one rotor is a mirror image of the movement of the knives of the other rotor. The advantage of this mirror image rotation pattern will be made more apparent as the description proceeds.

It is to be especially noted (FIG. 4) that each knife 48 is formed with a flat bevel edge surface 57 which intersects the inner face 61 of the knife to form the sharpened edge 50, which bevel edge surface 57 is generally tangent to its orbital path.

The included angle A defined by the bevel edge surface 57 and the inner face 61 of the knife 48 is shown in FIGURE 4 by way of example as being about 43 degrees. However, the flat bevel edge surface 57 may be formed so that angle A is of a value between 30 degrees and 60 degrees.

On the upper wall 29 of each channel member 28 and 30 there is positioned a respective flat plate or stop 52 and 54. As more fully shown in FIGURE 3 each plate 52 and 54 extends longitudinally from near the forward end of its associated channel member to a location just forward of the connecting plate 25. Each plate 52 and 54 is formed with respective substantially straight inner edges 56 and 58 facing each other thereby forming a longitudinal slot 59 positioned over and midway of the rotors.

A set of adjusting slots 60 are formed in outer edges of the plates 52 and 54. Directly below each adjusting slot 60 a threaded hole is formed through the upper wall 29 of the associated channel member. Bolts 63 are inserted through each opening 60 and nuts 65 are screwed onto the bolts against the underside of the upper wall 29. The flat plates 52 and 54 may thus each be transversely adjusted to a desired position and then by firmly tightening the nuts they may be secured in their adjusted positions.

As illustrated in FIGURES 2 and 4, the upstanding stalks of corn which pass between the channel members 28 and 30 also extend upwardly through the longitudinal slot 59. The inner edges 56 and 58 of the plates 52 and 54 are spaced from each other by a distance generally greater than the diameter of the largest stalk to be encountered but by a distance less than the diameter of the ears of corn growing on the stalks, as shown in FIGURE 4.

As illustrated in FIGURE 4, a knife 48 of each rotor 36 and 38 begins to cut into horizontally opposite sides of a stalk at the same time. The beveled edge surfaces 57 associated with each knife 48 are moved closer together horizontally as they move downwardly toward space D. The two opposed edge surfaces 57 thus grip and squeeze a portion of the corn stalk therebetween as they move downwardly and continue such squeezing action until the two edge surfaces 57 are disposed parallel with each other and just below the plane defined by the axes of the rotors.

It is thus seen that the sharpened edges 50 of the knives pierce the corn stalks a predetermined distance without completely severing the stalk. Thus the sharpened edges 50 pull the stalk downward through the slot 59. However, it may happen that due to an inherent weakness of some stalks, the action of the sharpened edges so further weakens the stalk that the stalk breaks off just after the sharpened edges pierce into the stalk; if so, the lower severed portion of the stalk will simply drop away beneath the rotors 36 and 38. The upper severed portion will however still be gripped between the opposed bevel edge surfaces 57 and will continue to be pulled downward through the slot 59 as the rotors continue to rotate. It is thus seen that by providing a sloped surface on each knife extending from the knife's sharpened edge in a direction opposite to the direction of rotation of the rotors upon which the knives are mounted a substantial amount of gripping force is applied to the stalks for very positive driving movement of the stalks downward through the slot 59. In addition the sloping surfaces obviate loss of control or gripping of the stalk in the event that the stalk should break.

Increasing the angle A will effect more positive or aggressive pinching and gripping action between the bevel edge surfaces 57. Decreasing the angle A will provide for easier and sharper penetration of the knife edges 50 into the stalk.

As the knives 48 continue to be rotated by the rotors 36 and 38, the gripped stalk is urged further downward through the slot 59. As previously mentioned, one knife edge 50 begins to cut into the stalk at the same time that another knife edge cuts into the stalk at a point on the horizontally opposite side thereof. There is thus a balance of forces on both sides of the engaged stalk such that there is no tendency to whip the stalk laterally to one side or another. By thus keeping the stalk upright and free from lateral whipping action, the tender ears of corn are prevented from being tossed about laterally and thus consequent bruising of the kernels is substantially reduced or obviated. In addition any tendency for the stalks to break by induced lateral whipping is substantially obviated.

Forward movement of the tractor 12 upon which the picker mechanism 14 is mounted will cause successively rearward portions of the plates 52 and 54 to be positioned vertically upward of the stalks while at the same time the rotor-mounted knives 48 cause the stalks to be pulled downwardly through the slot 59. Eventually the butt end of the lowermost ear of corn 142 enters into the slot 59 as shown in FIGURE 4. Since the ear of corn is wider in diameter than the width of the slot 59, the lower portion of the ear is pulled against the top and inner edges 56 and 58 of the plates 52 and 54. Continued rotation of the knives 48 will impose a downward thrust or force on the gripped stalk generally sufficient to break the vegetative material connecting the butt end of the ear to the stalk. The ear is thereby released from the stalk. In addition it is to be noted that a generally narrow ear of corn will have its butt end pulled more deeply into the slot 59. In such an event two opposed sharpened knife edges 50 cut into the vegetable connecting material as they cut into the stalk thereby further aiding severence of the narrow ear from the stalk.

It is to be noted that since the inner edges 56 and 58 of the plates 52 and 54 are located directly oposite from one another horizontally, the butt end of the ears are contacted at two diametrically opposite locations. The downward force which is imposed on the ears and resisted by the plates is thereby distributed over a relatively large area thereby decreasing the pressure (force per unit area) on the tender corn kernels near the butt end of the ear. In this manner bruising of the kernels near the butt end is substantially reduced.

In order to aid the gentle handling and conveying of the ears of corn, there is provided a gathering and conveying mechanism 61 disposed above the channel members 28 and 30. The gathering and conveying mechanism includes a pair of endless undulated belts 62 and 64. As shown in FIGURE 3, belt 62 has an inner run 66 in opposed facing relation with an inner run 68 of the other belt. The inner runs 66 and 68 are separated from each other by a space disposed over the slot 59 and extend from a location forwardly of the forward end of the rotors 36 and 38 to a location near the rear of the channel members 28 and 30. Each belt is mounted above an associated channel member. Since the mounting of both belts is the same, the description hereinafter will refer only to channel member 28 and belt 62. It will be understood that the other belt 64 is mounted in a similar manner.

An upright mounting post 70 is secured to the outside forward portion or corner of the channel member 28. A short tubular shaft 72 is secured to the top of the post 70 and extends longitudinally in a direction generally parallel with the channel member 28.

An extension rod 74 (FIG. 5) slidably fitted within the shaft 72 extends outwardly from its forward end. The rear end of the shaft 72 is provided with a closure having a central threaded hole. An adjusting rod 76 is threaded through the rear closure hole and into abutting engagement with the rear end of extension rod 74. Rotation of the rod 76 in either direction adjusts the extent of forward protrusion of the rod 74 from the shaft 72. A lock nut 78 is threaded over the rod 76 and may be firmly screwed against the end closure of shaft 72 for maintaining the adjusting rod in position.

On the top of the tubular shaft 72 near its forward end are three threaded holes. Set screws 82 are threadedly engaged in the holes for firm engagement with the surface of the extension rod 74. In this manner the angular position of the rod 74 with respect to the tubular shaft 72 may be adjusted. Adjustment of the angular position of rod 74 is for a purpose hereinafter described.

A sprocket wheel mounting bar 84 is secured to the forward end of the extension rod 74 at right angles thereto. Sprocket wheels 86 and 88 are rotatably mounted at opposite ends of the bar 84 for rotation about a common axis.

A sprocket wheel mounting post 90 is rotatably mounted on the rear end of the channel member 28 for rotation about its longitudinal axis which extends at right angles to the upper wall 29 of the channel member. Post 90 has a lower portion which extends through and a short distance below the lower wall 31 of the channel member. A pair of sprocket wheels 94 and 96 are secured to the upper portion of the post 90 and vertically spaced apart from each other by a distance equal to the spacing of the sprocket wheels 86 and 88 at the forward end of the channel member.

When the rod 74 is adjusted so that the common axis of rotation of the sprocket wheels 86 and 88 is parallel with the axis of post 90, the upper forward sprocket wheel 86 is at the same vertical height above the channel member 28 as is rear upper sprocket wheel 94. Likewise the lower forward sprocket wheel 88 is at the same vertical height above the channel member as is rear lower sprocket wheel 96. An upper tension member in the form of an endless chain 98 engageable by the sprocket teeth of the sprocket wheels 86 and 94 is trained thereabout. Also a lower endless chain 102, also formed of interconnected links engageable by sprocket teeth, is trained about the lower sprocket wheels 88 and 96. The chains 98 and 102 are of equal length. By releasing the set screws 82 associated with tubular shaft 72 and adjusting the rod 76, the forward sprocket wheels 86 and 88 are moved forward to provide a slight tension in the chains thereby causing the chains to run substantially straight with virtually no slack. An idler roller 104 is rotatably mounted on the upper wall 29 of channel member 28 between the lower sprockets 88 and 96 and bears against the inside portion of the inner run of chain 102. In this manner deflection of the inside run of chain 102 away from the slot 59 is substantially eliminated.

Alternate ones of the links of the chains 98 and 102 are formed with upper and lower tabs 106 and 108 extending vertically and offset a short distance outwardly of the chain. Each tab is provided with a hole. The belt 62 is made of a resilient flexible material such as for example rubber covered fabric and wrapped about the outside of chains 98 and 102 and attached thereto by means of bolts 114 inserted through suitably formed holes 110 (FIG. 5) in the belt and the holes of the tabs. Adjacent longitudinally spaced holes of the belt are spaced from each other by a distance greater than the longitudinal distance between holes of adjacent tabs. That portion of the belt 62 between its adjacent holes must be flexed in order to align its adjacent holes with corresponding holes of adjacent tabs of the chain. The result of such flexing is to form the belt into an undulated or corrugated shape having alternating protrusions or projections 116 and depressions 118 extending in a generally vertical direction.

The inner runs 66 and 68 are in opposed facing relation to each other. As illustrated in FIGURE 3, the inner runs 66 and 68 are so arranged that the protrusions 116 associated with the inner run of one belt are directly opposite the protrusions 116 of the inner run of the other belt. Likewise the depressions 118 of the inner runs are in directly opposed facing relation.

It is to be noted (FIG. 2) that the lower portions of the protrusions of the inner runs 66 and 68 are disposed just above the straight edges of respective plates 52 and 54. Thus the lower portions of the inner runs are spaced from each other by an amount such that opposed depressions generally form pockets or receptacles for receiving an ear of corn and holding it generally normal to the plates 52 and 54 and in generally a common plane with the slot 59.

It is to be noted that the upper portion of each endless belt 62 and 64 is bent thereby forming a flattened band 150 near its upper edge which gradually flares outwardly toward the protrusions 116. The opposed flared portions 152 of the inner runs thus form a funnel-like opening for gently guiding ears of corn downward toward the protrusions as the stalks are moved downwardly by the rotor knives 48. The flattened bands are formed by cutting or slitting each protrusion from the upper edge of the belt to a point downwardly therefrom a short distance. The portions of the belt on adjacent sides of slits 154 are then overlapped with each other and secured together with bolts 156 and nuts 158 or the like.

As illustrated in FIGURE 2, the sprocket wheel mounting bars 84 are tilted at an angle with respect to the vertical so as to form a flared or V-shaped entrance 124 at the forward end of the belts 62 and 64 which is wider at its upper portion than at its lower portion. The flared entrance 124 substantially aids gathering of stalks that may be bent somewhat laterally of the longitudinal center line of the row.

In addition it is to be noted that since each mounting part 90 is perpendicular to the upper wall 29 of the respective channel members 28 and 30, and the mounting bars 84 are tilted as set forth above the path disposition of each inner run 66 and 68 is progressively more vertical in the rearward direction. As illustrated in FIGURE 2 the rearward protrusions 116r near the rear end of the inner runs 66 and 68 are more nearly vertical than the forwardly located potrusions 116f.

The lower ends of posts 90 have secured thereto a respective sprocket wheel 124 and 126 (FIG. 3) each disposed in the same plane. A gear box mounting bracket 128 is secured to the side wall of channel member 30 near its rear end. A gear box 130 having an output shaft 132 protruding downwardly therefrom and an input shaft 134 extending rearwardly therefrom is secured to the mounting bracket. A sprocket wheel 136 is secured to the lower end of shaft 132 and disposed in the same plane as sprocket wheels 124 and 126. A guiding sprocket wheel 138 is rotatably mounted on the lower wall 31 of channel member 28 and disposed in the same plane as sprocket wheel 136, 124 and 126. An endless chain 140 is engaged with the sprocket wheels 136, 138, 124, and 126 such that clockwise rotation of sprocket wheel 136 (as viewed in FIG. 3) causes counterclockwise rotation of sprocket wheel 126 and clockwise rotation of sprocket wheel 124.

Rotation of sprocket wheels 124 and 126 causes corresponding rotation of posts 90 and their attached sprocket wheels 94 and 96. Rotation of sprocket wheels 94 and 96 causes the belts 62 and 64 to rotate such that the two inner runs 66 and 68 are moved rearwardly at equal speeds. Thus the aforementioned receiving pockets continuously formed at the forward end of the belts are moved at a constant speed to the rearward end of the belts.

The resilient corrugated belts 62 and 64 and their coaction in forming moving pockets is of special advantage. The ears of corn on a single corn stalk are vertically spaced from each other by rather random distances and they are circumferentially disposed about the stalk in a random manner. As shown in FIGURE 2, an ear of corn 142 growing on generally the right hand side of the stalk is engaged by the tilted forward portion of the right hand inner run 66. A rearwardly moving resilient protrusion 116 of the inner run 66 gently urges the ear rearwardly and toward a generally upright position. As the protrusion moves rearwardly the slope thereof is gradually changed to a generally vertical position. This change in slope of the protrusion further aids in orientating the ear of corn 142 into a vertical position. Further since the protrusion is generally acting on only one side of the ear (right side), the ear and stalk have a turning moment impressed thereon which effects turning or twisting of the stalk and ear about the vertical axis of the stalk. In this manner the ear of corn 142 is substantially centered above the slot 59 just prior to the time that the butt end of the ear enters the slot.

In FIGURE 3 there is shown a sprocket wheel 144 fixed to gear box input shaft 134. The rear end of rotor 38 which extends rearwardly through the bulkhead 40 has attached thereto a sprocket wheel 146 which is positioned in the same plane as sprocket wheel 144. An endless chain 148 is trained about the sprocket wheels 144 and 146. The rear end 67 of the rotor is suitably connected with power output shaft 22 of the tractor to effect rotation of the rotor at a constant speed in the clockwise direction as viewed from the front of the harvester (FIG. 3). Rotation of the rotor 36 effects rotation of rotor 38 in the clockwise direction by means of the intermeshed spur gears 44 and 46. Rotation of rotor 36 effects rotation of gearbox input shaft 134 thereby effecting movement of the endless belts 62 and 64 as described previously.

There has thus been shown and described a harvesting apparatus which is particularly advantageous in firmly gripping upstanding growing corn stalks and positively pulling the gripped stalks in a downward direction through an ear removal slot without whipping the stalks from side to side thereby substantially reducing the possibility of stalk breakage and bruising of the tender kernels of the corn ears. In addition the harvesting apparatus shown and described is advantageous in that it provides very gentle handling of the ears of corn while moving the ears through the apparatus by means of two flexibly resilient ear contacting belts 62 and 64 arranged and constructed for cooperation with each other to form a series of moving ear receiving pockets. In addition the endless belts gently lift and urge the ears of corn on the stalks so as to arrive at the ear removal slot in an orientation which substantially reduces the possibility of bruising of the kernels of the ear.

A preferred embodiment of the invention has been shown and described, but it will be understood that changes and modifications may be made in the details thereof without departing from the spirit and scope of the appended claims.

The invention having thus been described, what is believed to be new and desired to be protected by Letters Patent is:

1. In a corn harvester picker head of the type having stalk gathering means, ear abutment means below said gathering means spaced laterally for forming a stalk receiving slot, a pair of co-planar, counter-rotating rotors below said slot for pulling stalks through the slot, said rotors having hubs with symmetrically disposed knives thereon, means for simultaneously rotating said rotors, and rearwardly moving endless plant gathering belts trained around sprockets above and on both sides of said slot; the improvement wherein said plant gathering belts comprise opposed pairs of vertically spaced, endless tension members trained around and positively driven by said sprockets, a flexible belt spanning each pair of tension members, means connecting each belt to its tension members, the spacing of adjacent connecting means, when measured along the actual surface of said belts exceeding the straight line spacing of said connecting means, when measured along said tension members, to impart an undulating shape to the belts with the connecting means at the bases of the protrusions formed by the undulations, said belt protrusions of one belt being opposite those of the other of said belts along said slot to form flexible wall, generally upstanding plant receiving pockets between the protrusions.

2. The apparatus of claim 1, wherein the protrusions are flattened along the upper edges of the belts to form a funnel-like plant entry zone.

3. The apparatus of claim 1, wherein the plant engaging faces of said belts are relatively inclined from the vertical at their forward ends to form an upwardly opening V-shaped plant entrance, said belts progressively approaching the vertical as they move rearwardly.

References Cited

UNITED STATES PATENTS

| Re. 19,672 | 8/1935 | Malcom et al. | 171—61 X |
|---|---|---|---|
| 1,136,624 | 4/1915 | Small | 56—108 |
| 2,360,131 | 10/1944 | Hitchcock | 56—103 |
| 2,434,124 | 1/1948 | Schaaf et al. | 56—103 |
| 3,262,255 | 7/1966 | Karlsson et al. | 56—107 |

LUCIE H. LAUDENSLAGER, *Primary Examiner.*

U.S. Cl. X.R.

56—103, 113